US012066381B2

(12) United States Patent
Fischer et al.

(10) Patent No.: US 12,066,381 B2
(45) Date of Patent: Aug. 20, 2024

(54) OPTICAL MEASURING DEVICE

(71) Applicant: CLAAS Selbstfahrende Erntemaschinen GmbH, Harsewinkel (DE)

(72) Inventors: Frédéric Fischer, Arnsberg (DE); Johann Witte, Fröndenberg (DE); Ralf Marbach, Versmold (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 297 days.

(21) Appl. No.: 17/404,825

(22) Filed: Aug. 17, 2021

(65) Prior Publication Data
US 2022/0057322 A1 Feb. 24, 2022

(30) Foreign Application Priority Data
Aug. 24, 2020 (DE) .......................... 102020122041.3

(51) Int. Cl.
*G01N 21/359* (2014.01)
*A01D 41/12* (2006.01)
(Continued)

(52) U.S. Cl.
CPC ....... *G01N 21/359* (2013.01); *A01D 41/1208* (2013.01); *A01D 41/127* (2013.01);
(Continued)

(58) Field of Classification Search
CPC ....... G01N 2201/0642; G01N 21/4738; G01N 2201/065; G01N 2021/8592; G01J 3/46; G01J 3/524
See application file for complete search history.

(56) References Cited

U.S. PATENT DOCUMENTS 4,479,055 A * 10/1984 Perten .................... G01N 33/10
250/343
4,645,922 A * 2/1987 Welbourn ............ G01N 21/474
356/73
(Continued)

FOREIGN PATENT DOCUMENTS

| CN | 106644402 A * | 5/2017 | ............ G01M 11/00 |
| EP | 2923197 A1 | 9/2015 | |
| WO | WO-2014110664 A1 * | 7/2014 | ......... G01N 21/4738 |

OTHER PUBLICATIONS

Knowledge Center, "Integrating Sphere Fundamentals and Applications", https://www.ophiropt.com/laser—measurement/knowledge-center/article/10145, 2016 (Year: 2016).*
(Continued)

*Primary Examiner* — Maurice C Smith
(74) *Attorney, Agent, or Firm* — Lempia Summerfield Katz LLC (57) ABSTRACT

An optical measuring device for the spectral measurement of a sample is disclosed. The optical measure device includes an integrating cavity that has a diffusely reflective interior in order to render the light in the integrating cavity diffuse, a light source that is configured to emit light of a predetermined wavelength range into the integrating cavity, and a sensor that is configured to receive light from the integrating cavity, wherein the integrating cavity comprises an optical opening, and wherein the optical measuring device is provided and configured to measure a sample located outside of the integrating cavity directly in front of the optical opening.

17 Claims, 7 Drawing Sheets

(51) Int. Cl.
*A01D 41/127* (2006.01)
*G01N 21/33* (2006.01)
*G01N 21/31* (2006.01)
*G01N 21/85* (2006.01)

(52) U.S. Cl.
CPC ..... *G01N 21/33* (2013.01); *G01N 2021/3155* (2013.01); *G01N 2021/8592* (2013.01); *G01N 2201/0642* (2013.01); *G01N 2201/065* (2013.01)

(56) References Cited

U.S. PATENT DOCUMENTS

| | | | |
|---|---|---|---|
| 4,806,764 A | 2/1989 | Satake | |
| 4,963,743 A * | 10/1990 | Satake | G01N 33/02 250/341.8 |
| 6,061,140 A * | 5/2000 | Berg | G01N 21/474 356/418 |
| 6,424,413 B1 * | 7/2002 | Weber | G01J 3/0254 356/319 |
| 9,055,715 B2 | 6/2015 | Isfort | |
| 9,909,927 B1 * | 3/2018 | Estes | G01N 21/474 |
| 10,492,364 B2 | 12/2019 | Heitmann et al. | |
| 10,897,847 B2 | 1/2021 | Rathjens | |
| 2008/0204705 A1 | 8/2008 | Liu | |
| 2018/0364160 A1 * | 12/2018 | Aben | G01N 21/86 |
| 2019/0289787 A1 | 9/2019 | Heitmann et al. | |
| 2021/0023566 A1 * | 1/2021 | Marbach | B01L 3/502 |
| 2022/0200526 A1 * | 6/2022 | Fenning | G01N 21/3554 |

OTHER PUBLICATIONS

Corning Museum of Glass, "Lens Making in the 1600s", https://www.youtube.com/watch?v=2SJY0foypAo Apr. 28, 2016 (Year: 2016).*

European Search Report issued in related application No. EP21181115.3 mailed Dec. 1, 2021 (11 pages).

* cited by examiner

OPTICAL MEASURING DEVICE

CROSS REFERENCE TO RELATED APPLICATION

This application claims priority under 35 U.S.C. § 119 to German Patent Application No. DE 102020122041.3 filed Aug. 24, 2020, the entire disclosure of which is hereby incorporated by reference herein.

TECHNICAL FIELD

The invention relates to an optical measuring device for the spectral measurement of a sample. Moreover, the invention relates to an agricultural harvester having an optical measuring device for the spectral measurement of harvested material.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

An optical measuring device is disclosed in EP2923197A1. In such a measuring device, a sample is introduced as a thin layer into an integrating cavity and is measured spectrally at that location.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

As described in the background, EP2923197A1 introduces a sample as a thin layer into an integrating cavity and is measured spectrally at that location. However, introducing the sample as a thin layer requires the measuring device to have a complex geometry and appropriate supply apparatus.

In one or some embodiments, an optical measuring device for the spectral measurement of a sample is disclosed. The optical measuring device comprises: an integrating cavity that has at least a part of which is a diffusively reflective interior (such as all of which is a diffusively reflective interior) in order to render the light in the integrating cavity diffuse; a light source that is configured to emit light of a predetermined wavelength or a predetermined wavelength range into the integrating cavity; a sensor that is configured to receive light from the integrating cavity; wherein the integrating cavity comprises an optical opening, and wherein the measuring device is provided and configured to measure a sample located outside of the integrating cavity directly in front of the optical opening (e.g., the sample abuts part or all of the opening; the sample and the optical opening are positioned relative to one another such that light may be reflected from the sample back through the opening).

In one or some embodiments, the predetermined wavelength range of the light source is within the infrared range. Alternatively, or in addition, visible light and/or ultraviolet light may also lie within the predetermined wavelength range. Infrared light may be particularly suitable to detect water, proteins, lipids and carbohydrates. Moreover, the light source may emit other light into the cavity in addition to the predetermined wavelength range required for measurement. In one or some embodiments, the predetermined wavelength range is the range used to measure the sample. To detect water, the wavelength range between 960 nm and 980 nm may, for example, lie within the predetermined wavelength range.

The integrating cavity may serve to render light of the predetermined wavelength range diffuse. One example of an integrating cavity is an Ulbricht sphere. The integrating cavity need not be fixed to a spherical shape. The inner shape of the integrating cavity may be mostly spherical. The spherical shape ensures very evenly diffuse light.

The interior of the integrating cavity may, in particular, be diffusely reflective within the predetermined wavelength range.

In one or some embodiments, the sensor is at least light-sensitive within a subrange of a predetermined spectrum, such as the predetermined wavelength range. Moreover, the sensor may be insensitive or not register light outside of the predetermined spectrum. Given the insensitivity outside of the predetermined spectrum, the measurement need not be distorted by light outside of the predetermined spectrum.

In one or some embodiments, a first light barrier is provided or positioned on a path, such as the direct path, between the light source and opening, wherein the first light barrier is configured to prevent light from the light source from directly reaching the opening. The first light barrier thereby increases the likelihood, such as ensures, that only light diffusely scattered within the cavity reaches the sample. The surface of the first light barrier may also be diffusely reflective like the interior of the cavity. The sample may be illuminated very evenly by the forced diffuse scattering.

In another preferred embodiment, a second light barrier is provided or positioned on a path, such as the direct path, between the sensor and opening, wherein the second light barrier prevents light from the opening from directly reaching the sensor. The second light barrier thereby increases the likelihood, such as ensures, that only light reflected by the sample and diffusely scattered within the cavity reaches sensor. The surface of the second light barrier may also be diffusely reflective like the interior of the cavity. In one or some embodiments, the sensor only receives mixed light from the forced diffuse scattering. This minimizes the effect that changes in the surface quality of the sample would otherwise have on the measuring results.

In one embodiment, a third light barrier is provided or positioned on a path, such as the direct path, between the sensor and light source, wherein the third light barrier prevents light from the light source from directly reaching the sensor. The third light barrier thereby increases the likelihood, such as ensures, that only scattered light reaches the sensor. The measurement is therefore not distorted by direct light from the light source.

In particular when the first light source, the second light source, and the third light source are provided or included in the optical measuring device, particularly effective measurement of the sample is achieved.

In one embodiment, the sensor outputs data, and the measuring device comprises means for determining from the data from the sensor a proportion of at least one content, such as an indication of any one, any combination, or all of: moisture; protein; lipid; or carbohydrate in the sample. By directly determining the proportion of one or more contents, the user is relieved from analyzing the sensor data. The means for determining from the data from the sensor a proportion of at least one content may comprise at least one processor (including executable instructions) in combination with at least one memory (that stores the sensor data) with the processor executing the instructions to analyze the data in order to determine the proportion of the at least one content.

In another embodiment, at least one value of another feature of the sample is determined from the content concentration. The feature may, for example, be the digestibility or energy content of the sample; these features, which are functions of the content concentrations, may be directly determined from the content concentration. By directly determining the value of the feature, the user's burden is further lessened.

In one embodiment, the optical opening comprises (or consists of) glass, such as mineral glass, or such as sapphire glass. In this case, glass is to be understood broadly and comprises acrylic glass and sapphire glass in addition to mineral glass. Sapphire glass in particular is distinguished by a high scratch resistance. A high scratch resistance is advantageous when the sample comes into direct contact with the glass and could scratch it. Moreover, sapphire glass possesses effective transmission properties, in particular also within the infrared wavelength range.

In one embodiment, the measuring device comprises a first cover, wherein the first cover may be shoved, inserted or positioned between the light source and the integrating cavity so that the first cover reduces (or prevents) light from the light source from reaching the integrating cavity. The first cover allows a light-tight separation between the first light source and the integrating cavity. When the first cover separates the light source from the cavity, a dark signal may be recorded by the sensor, and a dark balance may thereby be carried out. Scattered light entering through the optical opening and the dark current from the sensor may be recorded in the dark signal.

In one embodiment, the measuring device comprises a second cover, wherein the second cover is provided or included and configured to temporarily close the optical opening so that the second cover reduces (or prevents) light from being able to enter through the optical opening into the integrating cavity. When the second cover closes the optical opening, a white signal may be recorded by the sensor, and a white balance may thereby be carried out. The light from the light source diffusely scattered by the cavity is recorded in the white signal.

The covers may be located inside or outside of the integrating cavity and mechanically shoved, inserted or positioned between the light source and cavity, or in front of the optical opening. In one or some embodiments, the covers are located outside of the cavity; consequently, the inner geometry of the cavity is not changed by the covers.

In one embodiment, the first and/or the second cover are diffusely reflective. Through the diffuse reflection, the interior of the cavity is completely diffusely reflective even when the cover is moved in front of the light source or in front of the optical opening. This minimizes light loss in addition to the heating of the mechanical components.

In one embodiment, the measuring device comprises several sensors, wherein the sensors have different spectral sensitivities. Differentiated measurement of the sample is enabled by the different spectral sensitivities. Accordingly for example, different sensors may be sensitive to wavelengths ranges that are characteristic of different contents. For example, a relatively economical spectrograph with a diode array comprising (or consisting of) so-called standard InGaAs material may detect the spectral range of 1.0 to 0.7 µm, and at the same time, another spectrograph with a diode array made from so-called extended InGaAs may detect longer wavelengths within a range of 1.7-2.4 µm. Since both spectrographs measure the same part of the sample, both spectra may be mathematically combined into a longer spectrum which enables more precise determination of the concentrations of the contents and sample features.

In one embodiment, the spectral sensitivity of the sensors is essentially generated by optical filters in front of the sensors. Optical filters are also termed spectral filters and are typically formed as bandpass filters. Bandpass filters may be designed as interference filters with an upstream lens. Alternatively, absorption filters are also possible. By using filters, identical broadband sensors may be used for differentiated measurements of the sample. This renders the design of the measuring device more favorable.

In one embodiment, the light source transmits a broadband light spectrum. A broadband light spectrum enables the differentiated measurement of the sample with only one light source. A preferred example of a broadband light source is a halogen lamp.

In one embodiment, the measuring device comprises a plurality of light sources, wherein the light sources each emit light with different wavelength ranges. The use of the plurality of light sources that emit light at different wavelength ranges enables the differentiated measurement of the sample with one or more broadband sensors. One example of light sources with different wavelength ranges are different LEDs. To obtain wavelength ranges that are more narrowband than those that may be emitted by the LEDs, optical filters may be used in front of the light source.

In one embodiment, the diffusely reflecting interior of the integrating cavity has a reflectance of at least 95%, or at least 98%, within the predetermined wavelength range. A high reflectance improves the dynamics of the sensor values and allows a weaker light source to be used. One example of a surface with a high reflectance within the near infrared wavelength range is a coating with polytetrafluoroethylene.

A second aspect of the invention is a harvester, such as a self-propelled harvester, having an optical measuring device according to one of the preceding features, wherein the measuring device is included in the harvester and configured to measure harvested material of the harvester. The optical measuring device may be particularly well-suited for measuring harvested material in an agricultural harvester.

A self-propelling harvester is, for example, a combine or forage harvester. With a combine, the optical measuring device is used to measure the threshed grains. To do this, the measuring device is attached to the so-called grain elevator. The grains are moved past the optical opening in the measuring device and measured in the process. With a forage harvester, the measuring device is used to measure the comminuted harvested material. To do this, the measuring device is attached to the discharge chute, and the harvested material moved through the discharge suit is moved past the optical opening in the measuring device and measured in the process.

Figure 1:
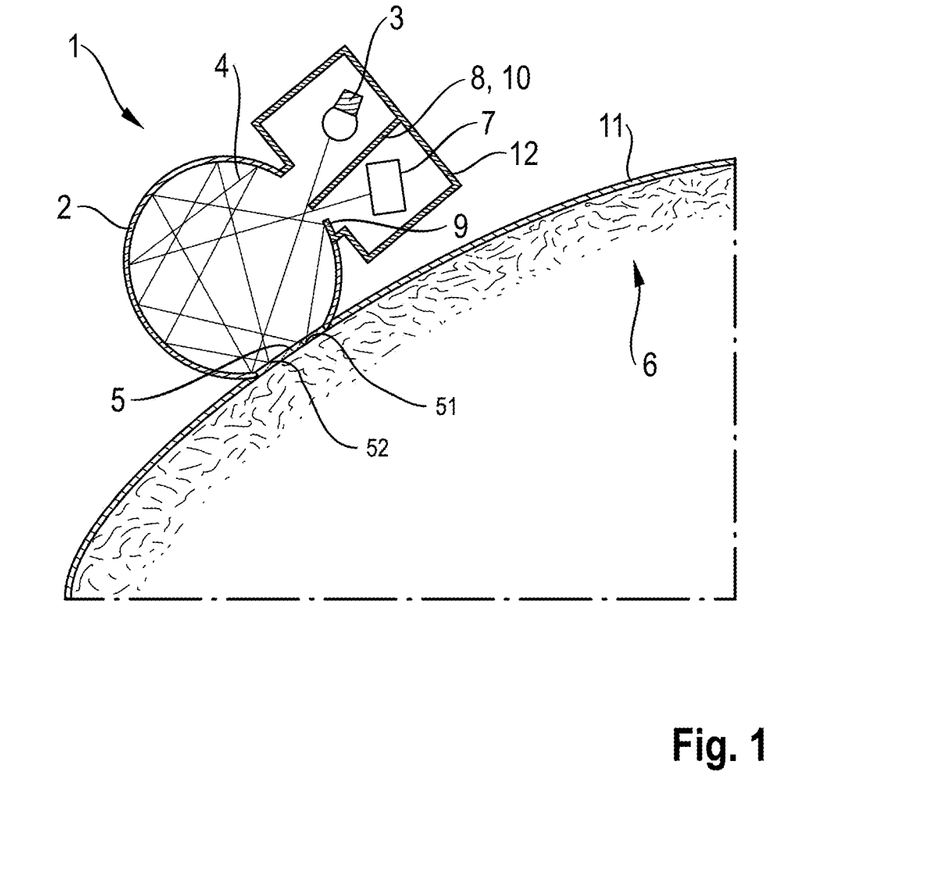
FIG. 1 illustrates a schematic representation of an optical measuring device.

FIG. 1 schematically shows optical measuring device 1. The optical measuring device 1 comprises an integrating cavity 2. The interior of the cavity 2 at least partly is diffusely reflective (such as an entire interior surface of the cavity 2 being diffusively reflective) and may be substantially spherical in shape. A light source 3 is located outside of the cavity 2 and emits light 4 at a predetermined wavelength into the cavity 2. The light 4 is scattered diffusely in the interior of the cavity 2. Through an optical opening 5 in the integrating cavity 2, a part of the light 4 strikes the sample 6 located outside of the cavity 2. The light 4 reflected by the sample 6 is again diffusely scattered within the cavity 2 and reaches the sensor 7. In one or some embodiments, the sensor 7 comprises a light sensor configured to generate data indicative of light sensed at a predetermined wavelength or predetermined wavelength range. In one or some embodiments, the light source 3 and the sensor 7 are located in a cuboid protrusion 12 of the integrating cavity 2. A first light barrier 8, 10 is present as a wall between the light source 3 and sensor 7. The light barrier 8, 10 has two tasks in this example. First, the light barrier 8 prevents light 4 from the light source 3 from directly reaching the optical opening 5. Second, the light barrier 10 prevents light 4 from the light source 3 from directly reaching the sensor 7. The first light barrier 8, 10 therefore fulfills the task of the above-described first light barrier and the third light barrier. In this regard, a single structure may perform more than one task, with the single structure separating the light source 3 and the sensor 7 in a cuboid protrusion 12 comprising a single wall or the like, with the single wall preventing light 4 from the light source 3 from directly reaching the optical opening 5 (hence the wall may be assigned "8" as the first light barrier) and with the single wall preventing light 4 from the light source 3 from directly reaching the sensor 7. In particular, as shown in FIG. 1, the single wall is angled such that light 4 emitted from light source 3 does not have a straight line path to optical opening 5. For example, the position of the wall is such that the light source 3, angled as depicted in FIG. 1, does not emit light 4 such that the light 4 impacts optical opening 5 in a straight line; rather, in this embodiment, light 4 must bounce off at least once off of the interior of the integrating cavity to impact optical opening 5, at least twice off of the interior of the integrating cavity to impact optical opening 5, at least three times off of the interior of the integrating cavity to impact optical opening 5 (as illustrated in FIG. 1), at least four times off of the interior of the integrating cavity to impact optical opening 5, at least five times off of the interior of the integrating cavity to impact optical opening 5, or at least six times off of the interior of the integrating cavity to impact optical opening 5. Also, as shown in FIG. 1, the single wall is angled such that light 4 emitted from light source 3 does not have a straight line path to a light sensitive surface of sensor 7. Alternatively, rather than having a single structure (such as a single wall) perform both functions of the first light barrier 8 and the third light barrier 10, separate structures may be used to perform the functions of the first light barrier 8 and the third light barrier 10.

A second light barrier 9 prevents light 4 from the optical opening 5 from directly reaching the sensor 7. In the example illustrated in FIG. 1, light 4 from the optical opening 5 is reflected off of the interior of the integrating cavity to impact the sensor 7 at least once, at least twice, at least three times, at least four times, at least five times (as shown in FIG. 1 with an additional impact on optical opening 5), at least six times, etc. Also, FIG. 1 illustrates that after the light 4 initially impacts optical opening 5 at 51, the light 4 may impact optical opening 5 at least once more at 52 prior to impact on the sensor 7. The optical measuring device 1 in this example is attached to a discharge chute 11 of a forage harvester. The optical opening 5 comprises (or consists of) sapphire glass. In this regard, the optical opening 5 may be composed of a material to enable the light to be reflected, such as illustrated in FIG. 1, and thus the material may act as an opening from the perspective of optics by the light traversing through the optical opening 5 and then the light being reflected back through the optical opening 5. The sapphire glass simultaneously may form as a part of the wall of the discharge chute 11.

Figure 2:
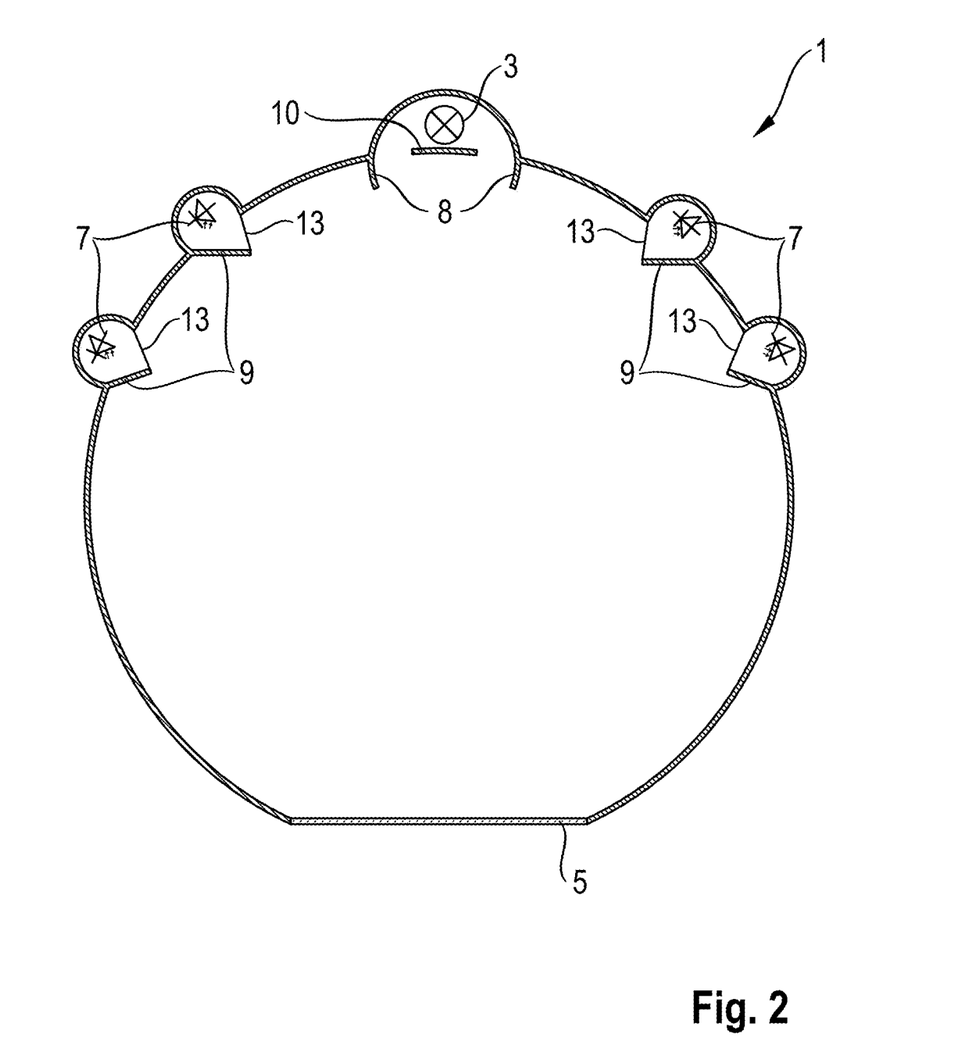
FIG. 2 illustrates a schematic representation of another optical measuring device.

FIG. 2 schematically portrays another optical measuring device 1. Only the differences from FIG. 1 will be described in the following. The light source 3, in this case a broadband halogen lamp, is attached in a hemispherical recess in the integrating cavity 2. Four identical sensors 7 are each attached in additional hemispherical recesses. Two first light barriers 8 (as shown by a protrusion on either side of light source 3) prevent light from the light source 3 from directly reaching the sensors 7. A second light barrier 9 is attached in front of one, some, or each sensor 7 and prevents the light from the optical opening 5 from directly reaching the sensors. A third light barrier 10 is attached in front of the light source and prevents light from the light source from directly reaching the optical opening 5. Narrowband optical bandpass filters 13 are attached so as to be positioned in front (from the perspective of incoming light to the sensors 7) of the sensors 7. Only one narrow wavelength range reaches the sensors 7 through the filters 13. In this regard, the spectral sensitivities of respective sensors 7 is determined at least in part, substantially, or entirely due to the respective filters 13 positioned in front of a respective sensor 7. Another filter 13 may be attached in front of each sensor 7 so that each sensor detects a different wavelength range. In this example, a first sensor measures a narrowband wavelength range of 1820 µm (via a first wavelength range filter 13), a second sensor measures a narrowband wavelength range of 2000 µm (via a second wavelength range filter 13), a third sensor measures a narrowband wavelength range of 1940 µm (via a third wavelength range filter 13), and a fourth sensor measures a narrowband wavelength range of 2110 µm (via a fourth wavelength range filter 13). The broadband light source emits light in all four wavelength ranges. The optical measuring device 1 in this example serves to measure moisture in the harvested material of a forage harvester. The data from the first sensor and second sensor may serve as baselines for calculating the moisture. The data from the third sensor may serve to measure the water component of the harvested material, and the data from the fourth sensor may serve to measure the cellulose component of the harvested material.

Figure 3:
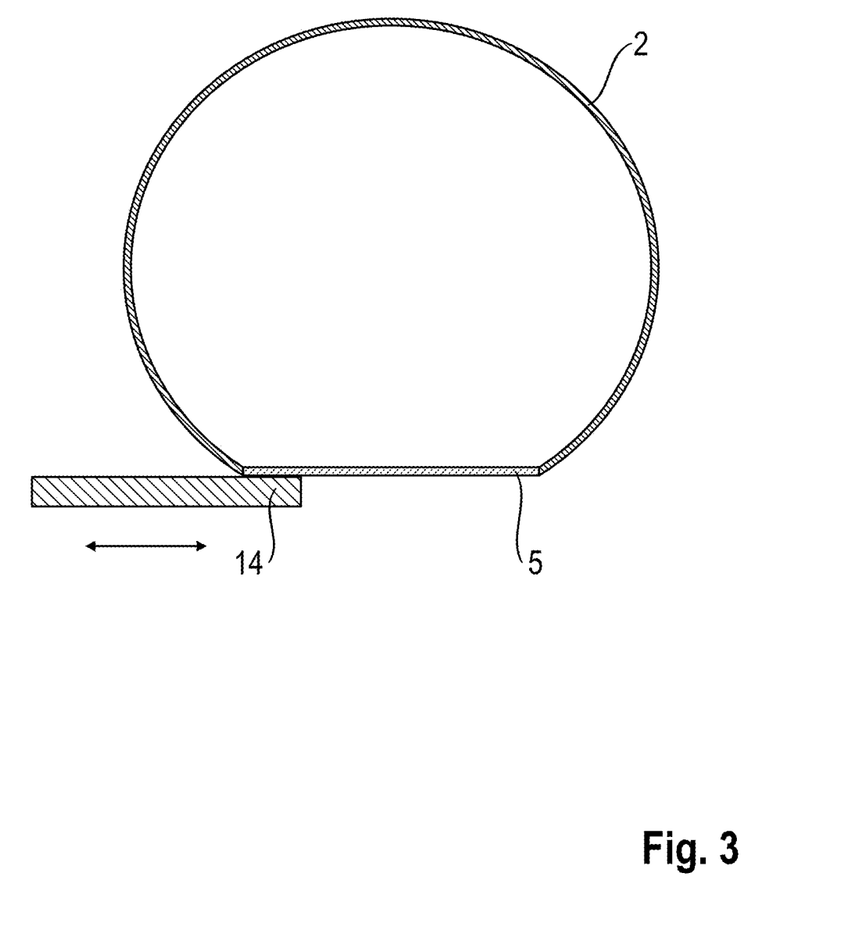
FIG. 3 illustrates a mode of operation of a cover.
Figure 4:
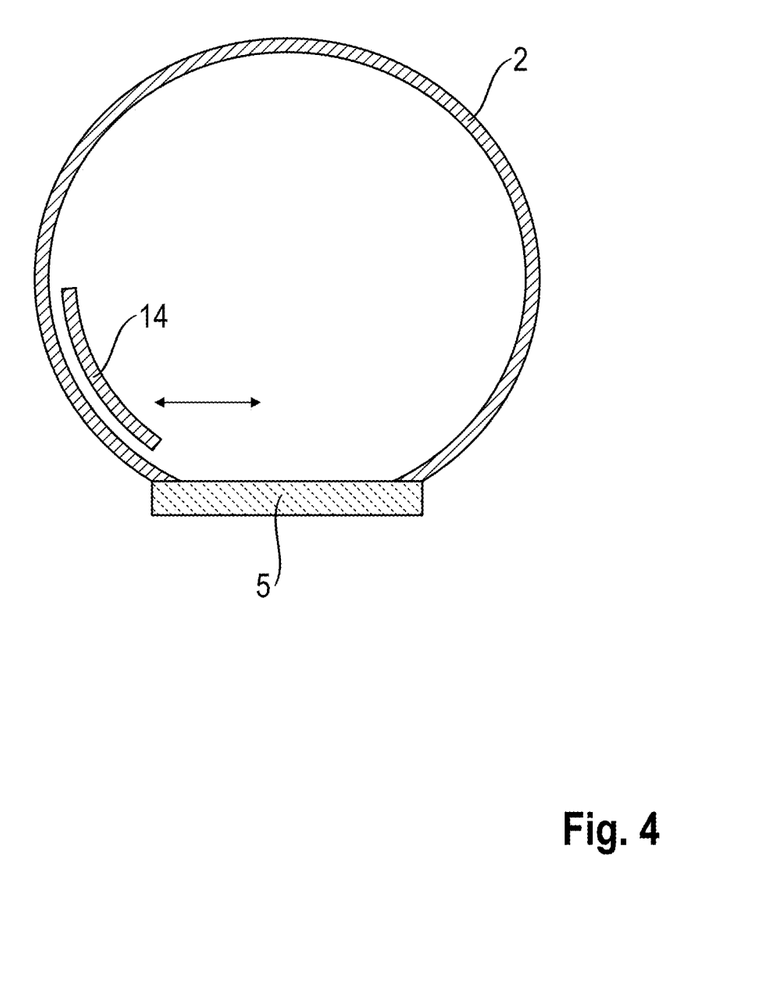
FIG. 4 illustrates an alternative mode of operation of a cover.
Figure 5:
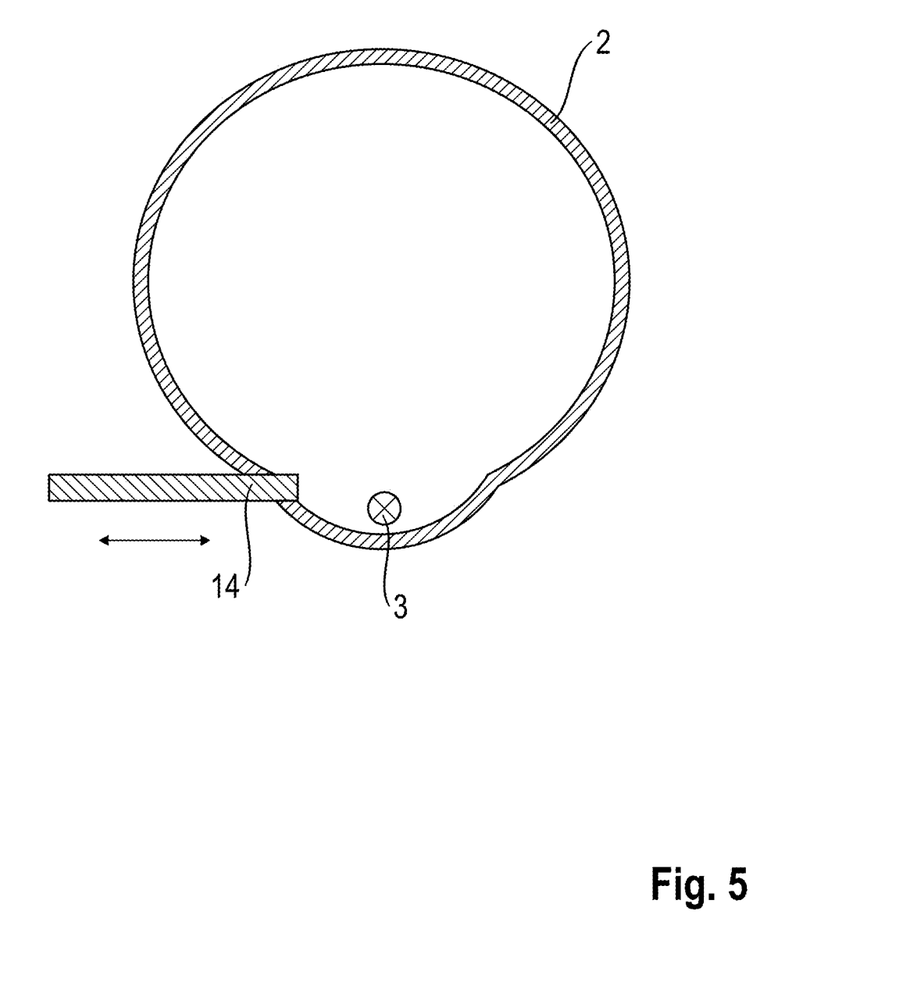
FIG. 5 illustrates another mode of operation of a cover.

FIGS. 3, 4 and 5 illustrate the mode of operation of covers of the optical opening or a recess for a light source. FIG. 3 shows an integrating cavity 2 with an optical opening 5 of sapphire glass. A cover 14 is located outside of the cavity 2 and may therefore be moved in front of the opening so that light cannot pass through the opening. When the cover 14 entirely closes or covers the optical opening 5 light-tight, a white signal may be recorded.

FIG. 4 shows an alternative cover 14. This cover 14 is located inside the cavity 2 and may be moved inside the cavity 2 so that light cannot pass through the optical opening 5.

FIG. 5 shows a cavity 2 and a light source 3 that are located in a recess in the cavity 2. A cover 14 may be moved in the cavity 2 so that the cover 14 prevents light from the light source from reaching the cavity. Of course, the cover 14 may also be moved within the cavity 2 like the cover from FIG. 4. In this regard, the cover is configured to be moved in a first position such that the cover is between the light source and the integrating cavity so that the cover prevents light from the light source from reaching the integrating cavity and configured to be moved in a second position such that the cover is not between the light source and the integrating cavity so that the light from the light source reaches the integrating cavity.

Figure 6:
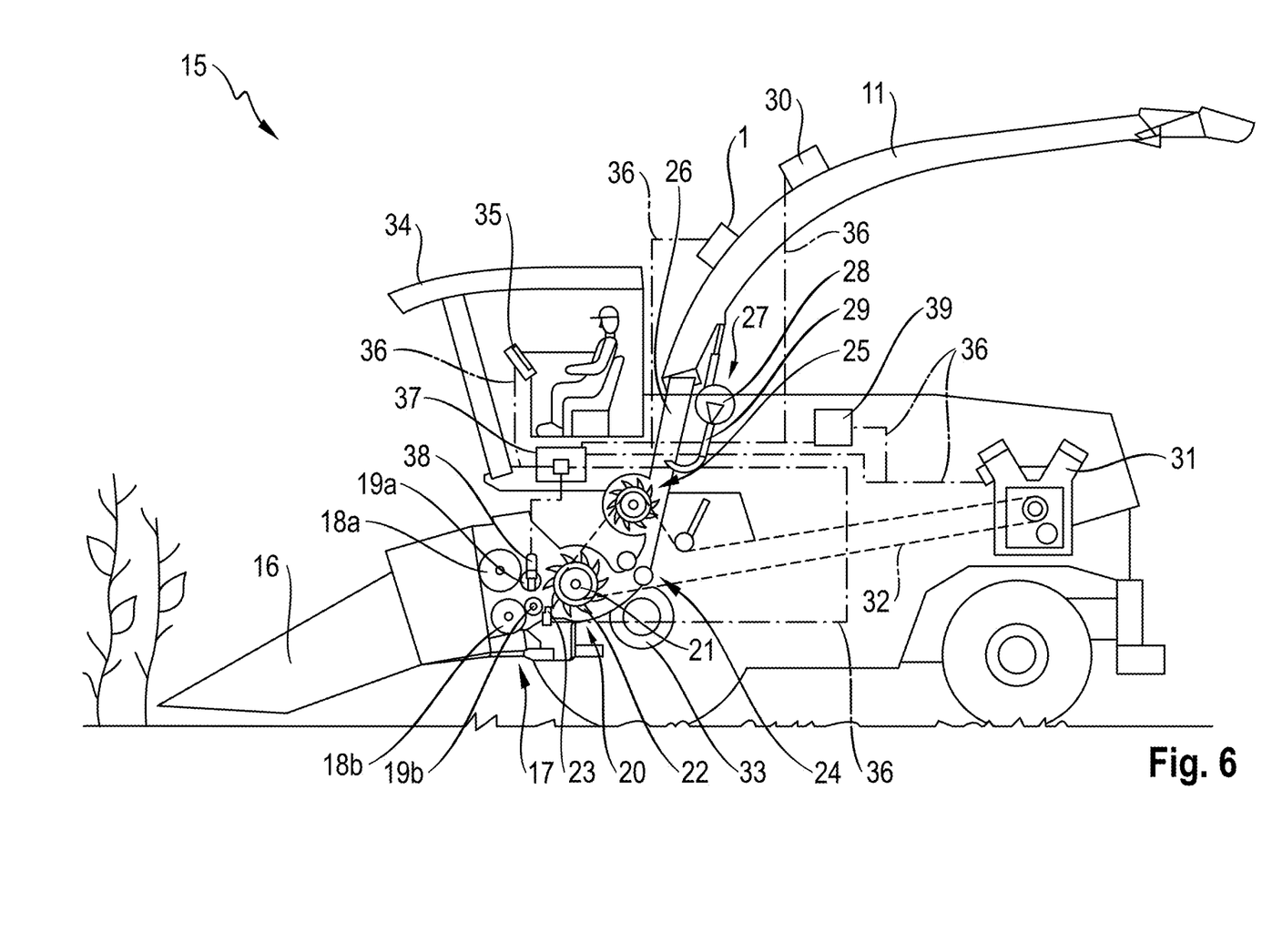
FIG. 6 illustrates a schematic representation of a forage harvester with an optical measuring device.

FIG. 6 shows a schematic representation of a forage harvester with an optical measuring device. An example of a forage harvester is disclosed in U.S. Pat. Nos. 9,055,715 and 10,897,847, both of which incorporated are by reference herein in their entirety. The forage harvester 15 has an attachment 16 for harvesting harvested material. The attachment 16 may be designed, inter alia, as a so-called corn header or a corn picker. To harvest grass, the attachment 16 may be designed as a mower. Other attachments are contemplated.

The harvested material gathered by the attachment 16 is supplied to a feed device 17. The feed device 17 comprises at least one first pair of rollers 18a, 18b and a second pair of rollers 19a, 19b that are arranged on a frame or a housing. The at least two roller pairs 18a, 18b and 19a, 19b serve to pull in and prepress the harvested material.

A chopping device 20 is downstream from the feed device 17. The chopping device 20 comprises a rotatably driven cutterhead 21 equipped with cutting blades 22. To comminute the harvested material supplied in the form of a compacted harvested material mat, the cutting blades 22 that rotate with the cutterhead 21 interact with a fixedly arranged shear bar 23 of the chopping device 20.

The comminuted harvested material leaving the chopping device 20 may be supplied to an optionally provided post-processing device 24. The post-processing device 24, which also may be termed a conditioning apparatus or a corn cracker, serves to crack corn grains in order to increase the usability or energy yield when used as feed or in a biogas plant.

From the chopping device 20 or the optional post-processing device 24, the comminuted harvested material passes to a post-acceleration device 25 that transfers the harvested material through a delivery shaft 26 and a subsequent discharge chute 11 designed as a discharge spout to a transport vehicle (not shown) driving adjacent to the forage harvester 15. In the region of the post-acceleration device 25, a silage additive metering device 27 is arranged or positioned that introduces a liquid into the delivery shaft 26 using a feed pump 28 with a changing delivery volume. For this, an injector 29 is provided that terminates in the delivery shaft 26 and ends in the direction of flow of the harvested material, whereby the liquid is applied in a finely sprayed form to the harvested material flowing by. At least one optical measuring device 1, such as discussed above, is arranged or positioned on the discharge chute 11 and is configured to measure at least one aspect of the harvested material. In the discharge chute 11, the harvested material is passed by the optical opening in the optical measuring device 1. The optical measuring device 1 measures the harvested material at one or several NIR frequencies and determines contents of the harvested material such as any one, any combination, or all of water, lipids, carbohydrates or proteins. The assignment of one or more additional sensors 30 for determining any one, any combination, or all of the chaff length, the flow speed of the harvested material and/or the mass flow of the harvested material flowing by to the ejection device (such as the discharge chute 11) may be provided.

To drive the forage harvester 15, a drive device 31 designed as an internal combustion engine is provided that drives the chopping device 20, the post-processing device 24 and the post-acceleration device 25 using a belt drive 32. The attachment 16 as well as the feed device 17 may be driven by another drivetrain that is mechanically coupled to the chopping device 20, or may be operated hydrostatically independently of the chopping device 20. Moreover, a hydrostatic drive 33 may be provided, through which the driving speed of the forage harvester 15 may be regulated.

The forage harvester 15 has a cabin 34 in which an input/output device 35 is provided that is presented for use by an operator of the forage harvester 15, such as, for example, to enable adjusting and adjusting operating parameters, and/or to inform the operator of current operating or harvesting conditions. The input/output device 35 is connected by a bus system 36 to a driver assistance system 37 of the forage harvester 15. The bus system 36 moreover connects the sensors 7, 30 to the ejection device, as well as a sensor 38 of the feed device 17 and other sensors or sensor systems and actuators (not shown in FIG. 1) for monitoring and adjusting and/or actuating any one, any combination, or all of the attachment 16, feed device 17, chopping device 20, grinding device, post-processing device 24, post-acceleration device 25, silage additive metering device 27, ejection device and the drive 33. The measured values determined by the optical measuring device 1 may be transmitted via the bus system 36 to the input/output device 35 and displayed there to the driver. Moreover, the driver may configure the optical measuring device 1 by the input/output device 35.

Moreover, the depiction in FIG. 6 shows a communication unit 39 that is connected to the bus system 36. The communication unit 39 is configured to transmit bus data to one or more external communication partners, and/or to transmit received data via the bus system 36. The measured values determined by the optical measuring device 1 may be transmitted via the bus system 36 and communication unit to an external location such as a farm management system. Moreover, configuration data sent from an external location may be received by the communication unit 39 and transmitted via the bus system 36 to the optical measuring device 1.

Figure 7:
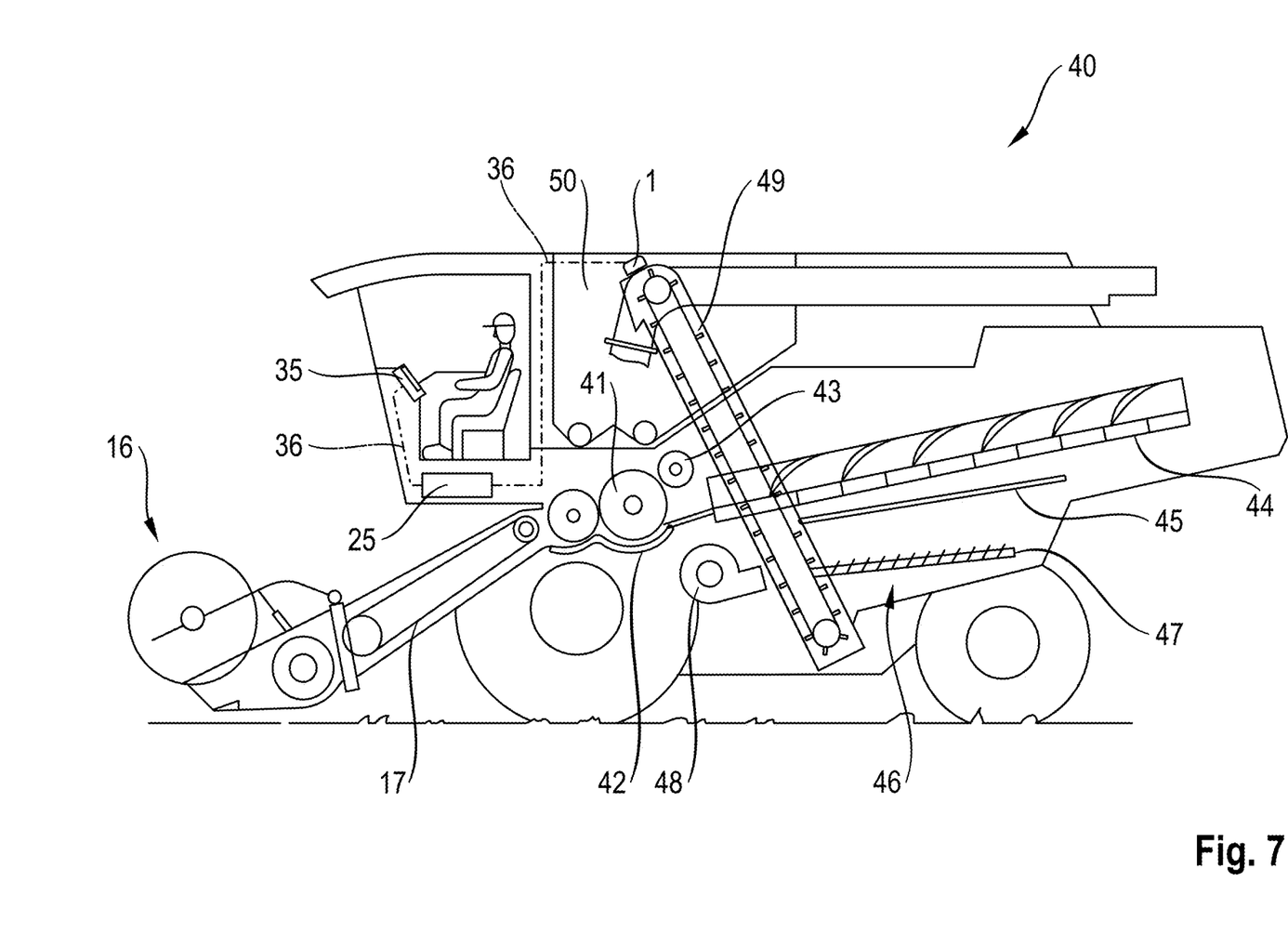
FIG. 7 illustrates a combine with an optical measuring device on a grain elevator.

FIG. 7 shows a schematic representation of a combine 40. An example of a combine is disclosed in U.S. Pat. No. 10,492,364, incorporated by reference herein in its entirety. The combine 40 includes an optical measuring device 1 for measuring harvested material, a driver assistance system 37, and an input/output device 35 for displaying the contents of the harvested material flow. Similar to the field harvester, the driver may configure the optical measuring device 1 by the input/output device 35. In this case, the driver assistance system 37 and the input/output device 35 may be designed separately or as a single unit.

The combine 40 has an attachment 16 for harvesting harvested material. The harvested material gathered by the attachment 16 is supplied to a feed device 17. The feed device 17 conveys the harvested material to a threshing system comprising (or consisting of) a threshing drum 41 and threshing concave. Using a deflection drum 43, the harvested material enters into a separating device 44 designed in this case as a separating rotor in which freely mobile grains of the harvested material flow are deposited in a lower area. From here, the harvested material flow passes via the returns pan 45 to a cleaning device 46 that, as illustrated, comprises (or consists of) several screening levels 47 and a blower 48. From here, the grain elevator 19 finally guides the harvested material flow to the grain tank 50. The optical measuring device 1 is at the top end of the grain elevator 49. The grain elevator 49 conveys the harvested material past the optical opening in the optical measuring device 1, and the optical measuring device 1 measures at least one aspect of the harvested material. The optical measuring device 1 may measure the harvested material at several NIR frequencies and may determine contents of the harvested material such as any one, any combination, or all of water, lipids, carbohydrates or proteins. The optical measuring device 1 is connected via a bus system 36 to the driver assistance system 37 and the input/output device 35. Thus, FIGS. 6 and 7 illustrate one or more devices downstream from the feed device in order to process or convey the harvested material.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another.

| List of Reference Numbers: | |
| --- | --- |
| 1 | Optical measuring device |
| 2 | Integrating cavity |
| 3 | Light source |
| 4 | Light |
| 5 | Optical opening |
| 6 | Sample |
| 7 | Sensor |
| 8 | First light barrier |
| 9 | Second light barrier |
| 10 | Third light barrier |
| 11 | Discharge chute |
| 12 | Protrusion |
| 13 | Filter |
| 14 | Cover |
| 15 | Forage harvester |
| 16 | Attachment |
| 17 | Feed device |
| 18a | Roller |
| 18b | Roller |
| 19a | Roller |
| 19b | Roller |
| 20 | Chopping device |
| 21 | Cutterhead |
| 22 | Cutting blade |
| 23 | Shear bar |
| 24 | Post-processing device |
| 25 | Post-acceleration device |
| 26 | Delivery shaft |
| 27 | Silage additive metering device |
| 28 | Delivery pump |
| 29 | Fuel injector |
| 30 | Sensor |
| 31 | Drive device |
| 32 | Belt drive |
| 33 | Drive |
| 34 | Cabin |
| 35 | Input/output device |
| 36 | Bus system |
| 37 | Driver assistance system |
| 38 | Sensor |

| List of Reference Numbers: | |
| --- | --- |
| 39 | Communication unit |
| 40 | Combine |
| 41 | Threshing drum |
| 42 | Threshing concave |
| 43 | Deflection drum |
| 44 | Separating device |
| 45 | Returns pan |
| 46 | Cleaning device |
| 47 | Sieve |
| 48 | Blower |
| 49 | Grain elevator |
| 50 | Grain tank |
| 51,52 | First, second impact on optical opening |

The invention claimed is:

1. An optical measuring device for spectral measurement of a sample, the optical measuring device comprising:
   an integrating cavity at least a part of which has a diffusely reflective interior in order to render light in the integrating cavity diffuse;
   at least one light source configured to emit light of a predetermined wavelength or predetermined wavelength range into the integrating cavity;
   at least one sensor configured to receive the light from the integrating cavity;
   wherein the integrating cavity comprises an optical opening;
   wherein the optical measuring device is configured to measure a sample located outside of the integrating cavity directly in front of the optical opening;
   further comprising a cover located inside the integrating cavity and configured to move within the integrating cavity so that no light passes through the optical opening; and
   wherein the cover is located entirely inside the integrating cavity when moving from a position whereby the light passes through the opening to a position whereby no light passes through the opening.

2. The optical measuring device of claim 1, further comprising a first light barrier is positioned on a direct path between the at least one light source and the opening; and
   wherein the first light barrier is positioned such that the light from the at least one light source is prevented from directly reaching the opening and wherein the light from the at least one light source is reflected one or more times in the integrating cavity before reaching the opening.

3. The optical measuring device of claim 2, wherein the light from the at least one light source is reflected two or more times in the integrating cavity before reaching the opening.

4. An optical measuring device for spectral measurement of a sample, the optical measuring device comprising:
   an integrating cavity at least a part of which has a diffusely reflective interior in order to render light in the integrating cavity diffuse;
   at least one light source configured to emit light of a predetermined wavelength or predetermined wavelength range into the integrating cavity, wherein the integrating cavity comprises an optical opening;
   at least one sensor configured to receive the light from the integrating cavity; and
   a second light barrier positioned on a direct path between the at least one sensor and the opening;

wherein the optical measuring device is configured to measure a sample located outside of the integrating cavity directly in front of the optical opening; and wherein the second light barrier is positioned such that the light from the opening is prevented from directly reaching the at least one sensor and wherein the light reaching from the opening is reflected one or more times in the integrating cavity before reaching the at least one sensor.

5. The optical measuring device of claim 4, wherein a third light barrier is on a direct path between the at least one sensor and light source; and wherein the third light barrier is configured to prevent the light from the at least one light source from directly reaching the at least one sensor.

6. The optical measuring device of claim 5, wherein a first light barrier is positioned on a direct path between the at least one light source and the opening, the first light barrier positioned such that the light from the at least one light source is prevented from directly reaching the opening and wherein the light from the at least one light source is reflected one or more times in the integrating cavity before reaching the opening; and wherein a single structure consists of the first light barrier and the third light barrier such that the single structure is configured to prevent the light from the at least one light source from directly reaching the opening and configured to prevent the light from the at least one light source from directly reaching the at least one sensor.

7. The optical measuring device of claim 1, wherein the at least one sensor is configured to generate data; and wherein the optical measuring device is configured to determine, from the data generated by the at least one sensor, an indication of at least one of moisture, protein, lipid or carbohydrate in the sample.

8. The optical measuring device of claim 1, wherein the optical opening comprises glass.

9. The optical measuring device of claim 1, wherein the at least one sensor comprises a plurality of sensors; and wherein the plurality of sensors have different spectral sensitivities.

10. The optical measuring device of claim 9, wherein the spectral sensitivity is generated at least in part by optical filters positioned in front of the plurality of sensors.

11. The optical measuring device of claim 1, wherein the at least one light source is configured to emit a broadband light spectrum.

12. The optical measuring device of claim 1, wherein the at least one light source comprises a plurality of light sources; and wherein the plurality of light sources are each configured to emit light with different wavelength ranges.

13. The optical measuring device of claim 1, wherein the diffusely reflecting interior of the integrating cavity has a reflectance of at least 95% within the predetermined wavelength or the predetermined wavelength range.

14. A harvester comprising:
a feed device configured to receive harvested material gathered by an attachment;
one or more devices downstream from the feed device in order to process or convey the harvested material;
an optical measuring device positioned relative to or on the one or more devices and configured for spectral measurement of a sample, the optical measuring device comprising:
an integrating cavity at least a part of which has a diffusely reflective interior in order to render light in the integrating cavity diffuse;
at least one light source configured to emit light of a predetermined wavelength or predetermined wavelength range into the integrating cavity;
at least one sensor configured to receive the light from the integrating cavity;
a cover;
wherein the integrating cavity comprises an optical opening;
wherein the cover is located inside the integrating cavity and configured to move within the integrating cavity so that no light passes through the optical opening;
wherein the optical measuring device is configured to measure a sample located outside of the integrating cavity directly in front of the optical opening;
wherein the optical measuring device further comprises a first light barrier positioned on a direct path between the at least one light source and the opening; and
wherein the first light barrier is positioned such that the light from the at least one light source is prevented from directly reaching the opening and wherein the light from the at least one light source is reflected one or more times in the integrating cavity before reaching the opening.

15. The harvester of claim 14, wherein the one or more devices comprise:
a chopping device downstream from the feed device and configured to comminute the harvested material from the feed device; and
a discharge device downstream from the chopping device and comprising a discharge spout; and
wherein the optical measuring device is positioned on the discharge device in order to measure at least one aspect of the harvested material as the harvested material is discharged.

16. The harvester of claim 14, wherein the one or more devices comprise:
a threshing system downstream from the feed device;
a cleaning device downstream from the threshing system; and
a grain elevator downstream from the cleaning device and configured to guide the harvested material to a grain tank; and
wherein the optical measuring device is positioned on at least a part of the grain elevator.

17. The harvester of claim 14, wherein the cover is located entirely inside the integrating cavity when moving from a position whereby the light passes through the opening to a position whereby no light passes through the opening.

* * * * *